(12) United States Patent
Zhou

(10) Patent No.: US 12,323,970 B2
(45) Date of Patent: Jun. 3, 2025

(54) METHOD FOR CROSS-CARRIER SCHEDULING AND NETWORK-SIDE DEVICE

(71) Applicant: BEIJING UNISOC COMMUNICATIONS TECHNOLOGY CO., LTD., Beijing (CN)

(72) Inventor: Huan Zhou, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 365 days.

(21) Appl. No.: 17/850,211

(22) Filed: Jun. 27, 2022

(65) Prior Publication Data

US 2022/0330285 A1 Oct. 13, 2022

Related U.S. Application Data

(63) Continuation of application No. PCT/CN2020/113303, filed on Sep. 3, 2020.

(30) Foreign Application Priority Data

Dec. 27, 2019 (CN) .......................... 201911376071.0

(51) Int. Cl.
*H04W 72/1263* (2023.01)
*H04W 24/08* (2009.01)
*H04W 72/0453* (2023.01)
*H04W 72/23* (2023.01)

(52) U.S. Cl.
CPC ....... *H04W 72/1263* (2013.01); *H04W 24/08* (2013.01); *H04W 72/0453* (2013.01); *H04W 72/23* (2023.01)

(58) Field of Classification Search
CPC ............. H04W 72/1263; H04W 72/23; H04W 72/0453; H04W 24/08
See application file for complete search history.

(56) References Cited

U.S. PATENT DOCUMENTS

| 12,063,645 B2 * | 8/2024 | Sun ........................ H04W 72/23 |
| 2014/0198748 A1 | 7/2014 | Lee et al. | |
| 2015/0304086 A1 * | 10/2015 | Kim ...................... H04L 5/0098 370/329 |

(Continued)

FOREIGN PATENT DOCUMENTS

| CN | 111132344 A * | 5/2020 | ............. H04W 24/08 |
| CN | 111132359 A * | 5/2020 | ............. H04L 5/001 |

(Continued)

OTHER PUBLICATIONS

Ericsson. "3GPP TSG RAN Meeting#84 RP-191052", Dynamic spectrum sharing in Rel-17,Jun. 6, 2019, 6 pages.

(Continued)

*Primary Examiner* — Shean Tokuta
(74) *Attorney, Agent, or Firm* — HAUPTMAN HAM, LLP

(57) ABSTRACT

Methods for cross-carrier scheduling and a network-side device are provided. The method includes the following. A network-side device transmits higher-layer signaling indicating that a primary cell (PCell) supports cross-carrier scheduling by one or more secondary cells (SCells).

11 Claims, 4 Drawing Sheets

(56) References Cited

U.S. PATENT DOCUMENTS

| | | | | |
|---|---|---|---|---|
| 2019/0349120 A1* | 11/2019 | Cheng | ................... | H04L 5/0053 |
| 2021/0021397 A1* | 1/2021 | Kim | ..................... | H04W 76/27 |
| 2022/0330285 A1* | 10/2022 | Zhou | ................ | H04W 72/1263 |
| 2022/0330314 A1* | 10/2022 | Takeda | .................... | H04L 5/001 |
| 2022/0369138 A1* | 11/2022 | Matsumura | ........... | H04L 5/0053 |
| 2023/0036466 A1* | 2/2023 | Yoshioka | ................. | H04L 5/001 |
| 2024/0137938 A1* | 4/2024 | Zhou | ....................... | H04L 5/001 |

FOREIGN PATENT DOCUMENTS

| | | | | | |
|---|---|---|---|---|---|
| CN | 110087337 B | * | 10/2020 | ........ | H04W 52/0225 |
| CN | 111132344 B | * | 1/2023 | ............ | H04W 24/08 |
| WO | WO-2021128931 A1 | * | 7/2021 | ............ | H04W 24/08 |
| WO | WO-2021130940 A1 | * | 7/2021 | | |
| WO | WO-2021130941 A1 | * | 7/2021 | ........ | H04W 72/1289 |

OTHER PUBLICATIONS

Ericsson. "3GPP TSG-RAN Meeting #86 RP-192677", Summary of Rel-17 email discussion on NR dynamic spectrum sharing, Dec. 2, 2019, 5 pages.

* cited by examiner

METHOD FOR CROSS-CARRIER SCHEDULING AND NETWORK-SIDE DEVICE

CROSS-REFERENCE TO RELATED APPLICATION(S)

This application is a continuation of International Application No. PCT/CN2020/113303, filed Sep. 3, 2020, which claims priority to Chinese Patent Application No. 201911376071.0, filed Dec. 27, 2019, the entire disclosures of which are incorporated herein by reference.

TECHNICAL FIELD

This disclosure relates to the field of communication technology, and in particular, to methods for cross-carrier scheduling and a network-side device.

BACKGROUND

In carrier aggregation (CA) scenarios, for saving overhead for physical downlink control channels (PDCCHs), cross-carrier scheduling can be supported on the PDCCHs, such that a user equipment (UE) can obtain scheduling information on multiple carriers by detecting a PDCCH on one carrier.

The UE needs to monitor a PDCCH of a secondary cell (SCell) on another cell if cross-carrier scheduling is configured for the SCell serving the UE.

In current CA scenarios, only cross-carrier scheduling from primary cells (PCells) to SCells is supported, resulting in a limited PDCCH capacity of the PCells.

SUMMARY

According to an aspect of the disclosure, a method for cross-carrier scheduling is provided. The method is applied to a network-side device and includes transmitting higher-layer signaling indicating that a primary cell (PCell) supports cross-carrier scheduling by one or more secondary cells (SCells).

According to another aspect of the disclosure, a method for cross-carrier scheduling is provided. The method is applied to a user equipment (UE) and includes receiving higher-layer signaling indicating that a PCell supports cross-carrier scheduling by one or more SCells.

According to another aspect of the disclosure, a network-side device is provided. The network-side device includes a transceiver, a processor and a memory configured to store instructions executable by the processor, where the processor is configured to execute the instructions to cause the transceiver to transmit higher-layer signaling indicating that a PCell supports cross-carrier scheduling by one or more SCells.

BRIEF DESCRIPTION OF THE DRAWINGS

The accompanying drawings that are included in and constitute a part of the description, together with the description, illustrate exemplary implementations, features, and aspects of the disclosure, and are intended for explaining the principles of the disclosure.

DETAILED DESCRIPTION

Figure 1:
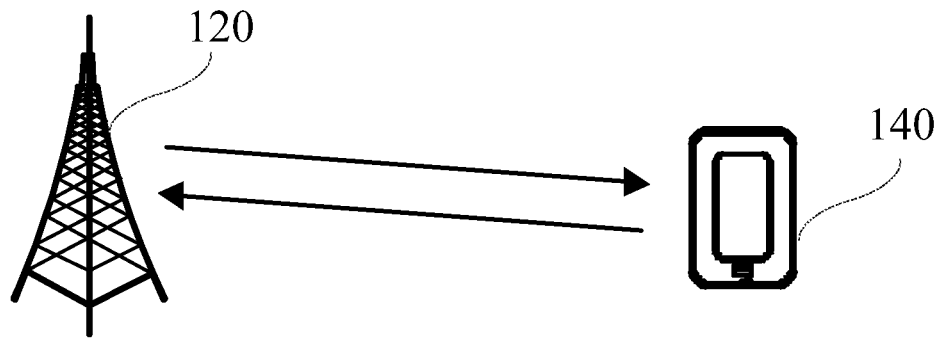
FIG. 1 is a schematic structural diagram of a mobile communication system provided in an exemplary implementation of the disclosure.

Various exemplary implementations, features, and aspects of the disclosure will be described in detail below with reference to the accompanying drawings. The same reference numerals in the drawings represent elements with the same or similar functions. Although various aspects of the implementations are illustrated in the drawings, it is not necessary to draw the drawings to scale unless specifically noted.

The term "exemplary" herein means "as an example, implementation, or illustrative". Any implementation described herein as "exemplary" need not be interpreted as superior to or better than other implementations.

In addition, in order to better illustrate the disclosure, many specific details are given in the following specific implementations. Those skilled in the art should understand that the disclosure can still be implemented without some specific details. In some examples, methods, means, elements, and circuits well-known to those skilled in the art are not described in detail in order to highlight the subject matter of the disclosure.

In current carrier aggregation (CA) scenarios, only cross-carrier scheduling on a secondary cell (SCell) is supported, while a primary cell (PCell) only supports self-scheduling. If cross-carrier scheduling is configured for a cell serving a user equipment (UE), it means that the UE needs to monitor a physical downlink control channel (PDCCH) of the cell on another cell, while there is no PDCCH transmission on the cell.

In the current CA scenarios, only self-scheduling on the PCell or cross-carrier scheduling from the PCell to the SCell are supported, which results in a limited PDCCH capacity of the PCell, thereby leading to bottleneck problems such as insufficient PDCCH resources, too many PDCCH blind detections, or the like.

For the above, methods and apparatuses for cross-carrier scheduling, and a storage medium are provided in implementations of the disclosure. In implementations of the disclosure, a network-side device transmits higher-layer signaling indicating that a PCell supports cross-carrier scheduling by one or more SCells, such that the one or more SCells can perform cross-carrier scheduling on the PCell, thereby reducing the use of a PDCCH of the PCell, increasing a PDCCH capacity of the PCell, avoiding a limited PDCCH capacity of the PCell due to the PCell that only can support self-carrier scheduling or cross-carrier scheduling on other cells, and ensuring sufficient PDCCH resources for the PCell.

Referring to FIG. 1, FIG. 1 illustrates a schematic structural diagram of a mobile communication system provided in an exemplary implementation of the disclosure. The mobile communication system may be a long term evolution (LTE) system, or may be a $5^{th}$ generation (5G) system. The 5G system is also called a new radio (NR) system. The mobile communication system can also be a next-generation mobile communication system of 5G, which is not limited herein.

Optionally, the mobile communication system is applicable to different network architectures, including but not limited to a relay network architecture, a dual link architecture, a vehicle-to-everything (V2X) architecture, etc.

The mobile communication system includes a network-side device 120 and a UE 140.

The network-side device 120 may be a base station (BS), and may also be referred to as a base station device, which is deployed in a radio access network (RAN) to provide a wireless communication function. For example, a device that provides base station functions in $2^{nd}$ generation (2G) networks includes a base transceiver station (BTS), a device that provides base station functions in $3^{rd}$ generation (3G) networks includes a Node B (NodeB), a device that provides base station functions in $4^{th}$ generation (4G) networks includes an evolved Node B (evolved NodeB, eNB), a device that provides base station functions in wireless local area networks (WLAN) is an access point (AP), and a device that provides base station functions in the 5G system is a gNB and a continuously evolved Node B (ng-eNB). The network-side device 120 in implementations of the disclosure further includes a device that provides base station functions in a new communication system in the future. The specific implementation of the network-side device 120 is not be limited in implementations of the disclosure. An access-network device may further include a home eNodeB (Home eNB, HeNB), a relay, a pico base station (Pico), or the like.

A base station controller is an apparatus that manages base stations, such as a base station controller (BSC) in the 2G network, a radio network controller (RNC) in the 3G network, or an apparatus that controls and manages base stations in a new communication system in the future.

The network-side device 120 includes a base station in RAN, or may include a BSC in RAN, or may include a device at a core-network side.

A core network may be an evolved packet core (EPC), a 5G core network (5GCN), or may be a new core network in a future communication system. The 5G core network consists of a set of devices and includes an access and mobility management function (AMF) that implements functions such as mobility management, a user plane function (UPF) that provides functions such as packet routing and forwarding and quality of service (QoS) management, a session management function (SMF) that provides functions such as session management and internet protocol (IP) address allocation and management, and the like. EPC can include a mobility management entity (MME) that provides functions such as mobility management and gateway selection, a serving gateway (S-GW) that provides functions such as packet forwarding, and a packet data network (PDN) gateway (P-GW) that provides functions such as terminal address allocation and rate control.

The network-side device 120 establishes a wireless connection with the UE 140 through a wireless air interface. Optionally, the wireless air interface is a wireless air interface based on a 5G standard, e.g., the wireless air interface is NR. Optionally, the wireless air interface may also be a wireless air interface based on a 5G next-generation mobile communication network technology standard. Optionally, the wireless air interface may also be a wireless air interface based on the 4G standard (LTE system). The network-side device 120 can receive uplink (UL) data transmitted by the UE 140 through the wireless connection.

The UE 140 may refer to a device that performs data communication with the network-side device 120. The UE 140 can communicate with one or more core networks through RAN. The UE 140 may refer to various UE, access terminal devices, subscriber units, subscriber stations, stations, mobile stations (MS), remote stations, remote terminal devices, mobile devices, terminals, terminal equipment, wireless communication devices, user agents, or user apparatuses. The UE 140 may also be a cellular phone, a cordless phone, a session initiation protocol (SIP) phone, a wireless local loop (WLL) station, a personal digital assistant (PDA), a handheld device with wireless communication functions, a computing device, other processing devices coupled with a wireless modem, an in-vehicle device, a wearable device, a terminal device in a future 5G network, a terminal device in a future evolved public land mobile network (PLMN), etc., which is not limited in this implementation. The UE 140 can receive downlink (DL) data transmitted by the network-side device 120 through a wireless connection with the network-side device 120.

It is to be noted that, when the mobile communication system illustrated in FIG. 1 adopts the 5G system or the next-generation mobile communication system of 5G, the above-mentioned network elements may have different names in the 5G system or the next-generation mobile communication system of 5G, but have the same or similar functions, which will not be limited in implementations of the disclosure.

It is to be noted that, the mobile communication system illustrated in FIG. 1 may include multiple network-side devices 120 and/or multiple UEs 140. FIG. 1 exemplarily illustrates one network-side device 120 and one UE 140, but this is not limited in implementations of the disclosure.

The following will illustrate a method for cross-carrier scheduling provided in implementations of the disclosure with several exemplary implementations.

Figure 2:
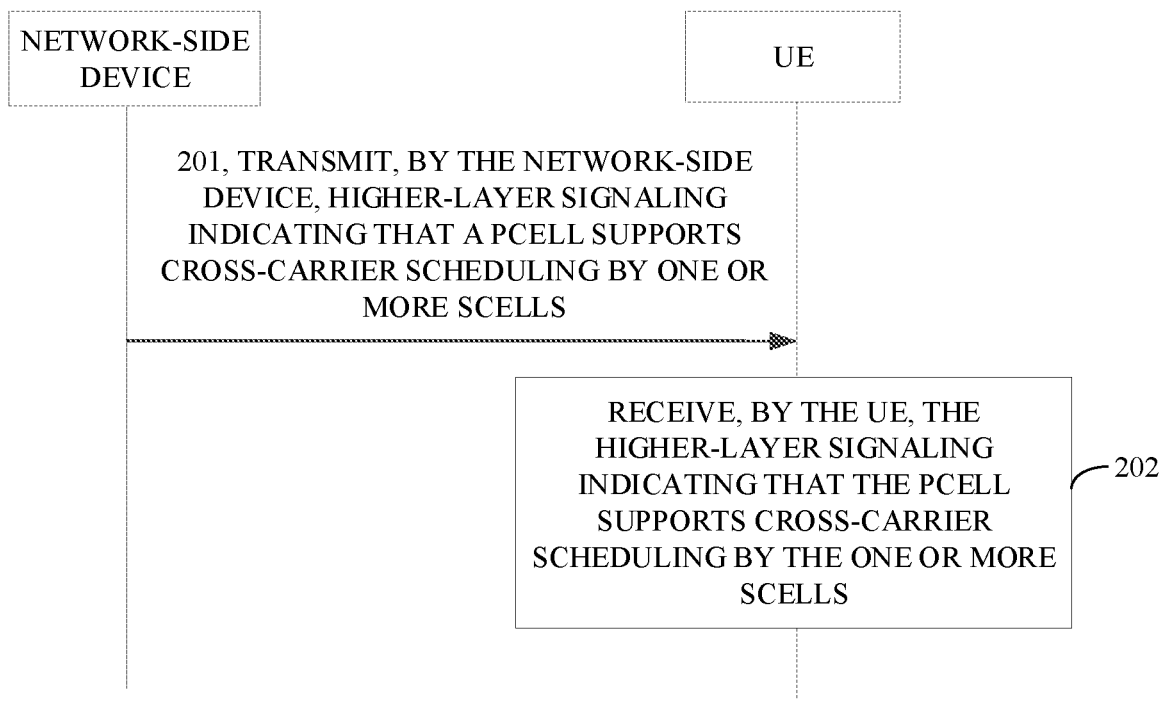
FIG. 2 is a flowchart of a method for cross-carrier scheduling provided in an exemplary implementation of the disclosure.

Referring to FIG. 2, FIG. 2 is a flowchart of a method for cross-carrier scheduling provided in an exemplary implementation of the disclosure. In the implementation, the method is exemplarily applied to the mobile communication system illustrated in FIG. 1. The method includes the following.

At 201, the network-side device transmits higher-layer signaling indicating that a PCell supports cross-carrier scheduling by one or more SCells.

The network-side device transmits to the UE the higher-layer signaling, where the higher-layer signaling indicates that the PCell supports cross-carrier scheduling by the one or more SCells.

In implementations of the disclosure, the PCell is a scheduled cell, and the one or more SCells are scheduling cells.

The network-side device transmits the higher-layer signaling to the UE through a DL channel. Optionally, the DL channel includes a PDCCH, which will not be limited herein.

Optionally, the higher-layer signaling further indicates that the PCell supports self-carrier scheduling, and/or, the higher-layer signaling further indicates that the PCell supports to cross-carrier-schedule the one or more SCells.

Optionally, the higher-layer signaling is radio resource control (RRC) signaling, which will not be limited herein.

At 202, the UE receives the higher-layer signaling indicating that the PCell supports cross-carrier scheduling by the one or more SCells.

Correspondingly, the UE receives the higher-layer signaling transmitted by the network-side device. Optionally, the UE receives the higher-layer signaling transmitted by the network-side device through the DL channel.

The UE performs cross-carrier scheduling on the PCell through the one or more SCells according to the higher-layer signaling, that is, the UE monitors a PDCCH of the PCell on the one or more SCells.

Optionally, for one SCell of the one or more SCells, the UE monitors a PDCCH of the SCell on the SCell and simultaneously monitors the PDCCH of the PCell.

It is to be noted that, in implementations of the disclosure, there is still a PDCCH on the PCell, and there is also the PDCCH of the PCell on the scheduling cell, i.e., on the one or more SCells.

In a word, in implementations of the disclosure, the network-side device transmits the higher-layer signaling to the UE, and correspondingly, the UE receives the higher-layer signaling indicating that the PCell supports cross-carrier scheduling by the one or more SCells. As such, the one or more SCells can perform cross-carrier scheduling on the PCell, thereby reducing the use of the PDCCH of the PCell, increasing a PDCCH capacity of the PCell, avoiding a limited PDCCH capacity of the PCell because the PCell only can support self-scheduling or cross-carrier scheduling on other cells, and ensuring sufficient PDCCH resources for the PCell.

Figure 3:
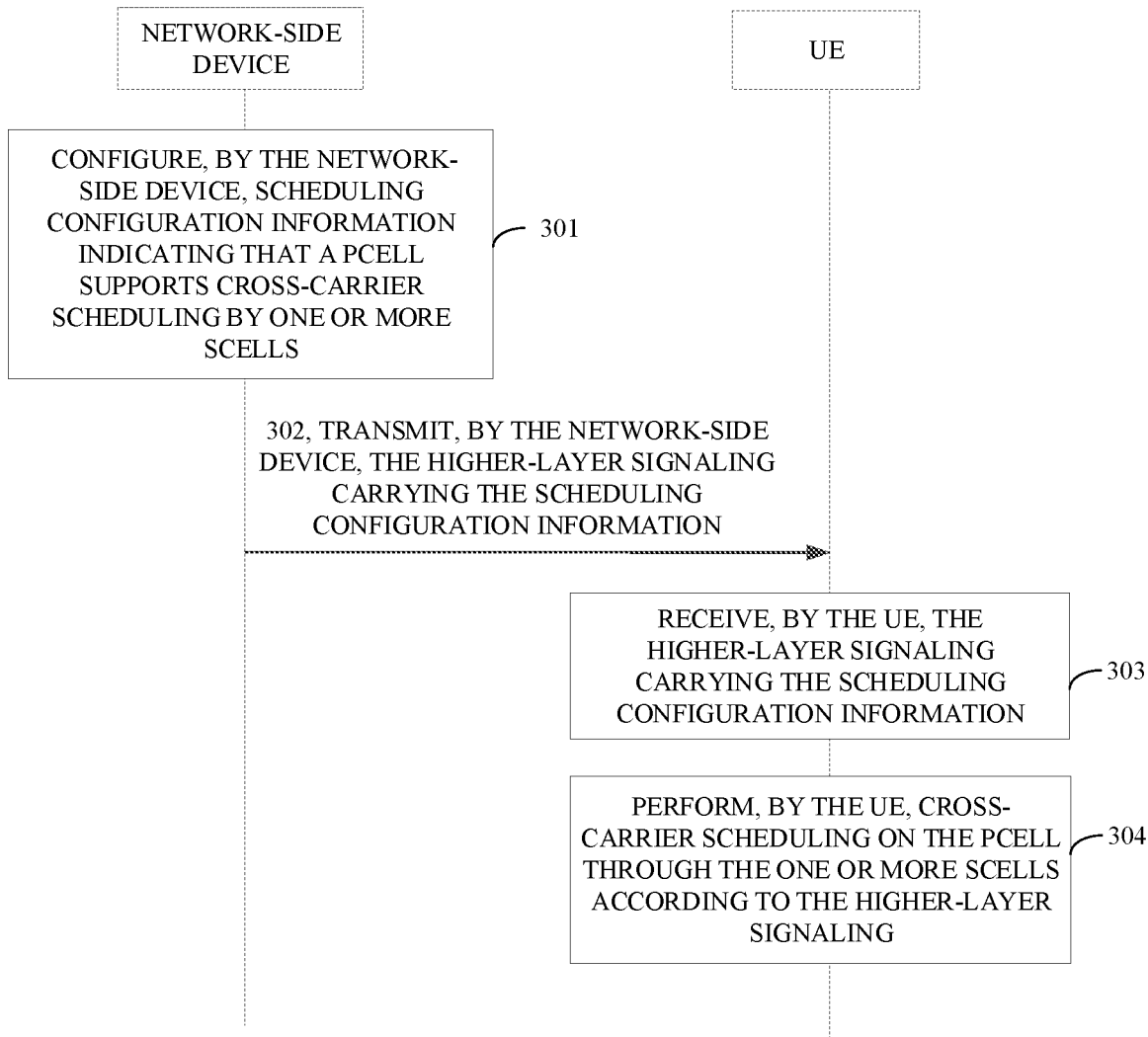
FIG. 3 is a flowchart of a method for cross-carrier scheduling provided in another exemplary implementation of the disclosure.

Referring to FIG. 3, FIG. 3 is a flowchart of a method for cross-carrier scheduling provided in another exemplary implementation of the disclosure. In the implementation, the method is exemplarily applied to the mobile communication system illustrated in FIG. 1. The method includes the following.

At 301, the network-side device configures scheduling configuration information indicating that a PCell supports cross-carrier scheduling by one or more SCells.

In implementations of the disclosure, the PCell includes a PCell in a master cell group (MCG) or a primary secondary cell (PSCell) in a secondary cell group (SCG).

It is to be noted that, the MCG includes a PCell or additionally includes one or more SCells, and the SCG includes a PSCell or additionally includes one or more SCells.

Optionally, the scheduling configuration information further indicates that the PCell supports to cross-carrier-schedule other cells, where the other cells are the one or more SCells.

Optionally, cross-carrier scheduling configuration information (CrossCarrierSchedulingConfig) includes one of first scheduling configuration information and second scheduling configuration information. The first scheduling configuration information indicates that only self-scheduling is supported and indicates that whether to cross-carrier-schedule other cells through a carrier indicator field (CIF) value, and the second scheduling configuration information indicates that cross-carrier scheduling by other cells is supported. Exemplarily, the first scheduling configuration information is set to be "own", and the second scheduling configuration information is set to be "other".

In implementations of the disclosure, the scheduling configuration information configured by the network-side device is the second scheduling configuration information above.

Optionally, the network-side device configures cross-carrier scheduling information in a case that the network-side device configures the scheduling configuration information, where the cross-carrier scheduling information is scheduling information for the SCell to schedule the PCell.

Optionally, the cross-carrier scheduling information includes cross-carrier scheduling information corresponding to a SCell or the cross-carrier scheduling information includes cross-carrier scheduling information corresponding to each of multiple SCells.

The cross-carrier scheduling information includes cross-carrier scheduling information corresponding to one SCell in a case that the PCell is scheduled by the SCell. The cross-carrier scheduling information includes cross-carrier scheduling information corresponding to each of multiple SCells in a case that the PCell is scheduled by the multiple SCells.

Optionally, the cross-carrier scheduling information corresponding to the SCell contains a CIF value and a cell identifier (ID) of the SCell. That is, cross-carrier scheduling information corresponding to a SCell contains a CIF value and a cell ID of the SCell, or cross-carrier scheduling information corresponding to each of multiple SCells contains a CIF value and a cell ID of each of the multiple SCells.

Optionally, the CIF value indicates a PDCCH of a scheduled cell, that is, the PCell. Exemplarily, the CIF value defaults to 0, and if the CIF value is not 0, a PDCCH identified by the CIF value on the SCell is the PDCCH of the PCell.

The cell ID of the SCell is used to uniquely identify the SCell in the multiple SCells.

Optionally, the network-side device configures higher-layer parameter configuration in a case that the network-side device configures the scheduling configuration information, where the higher-layer parameter configuration indicates a searching space to-be-monitored in the SCell(s).

Optionally, prior to transmitting the higher-layer signaling by the network-side device, the method further includes the following. The network-side device configures PDCCH configuration information for each bandwidth part (BWP) of the PCell or the SCell through the higher-layer signaling, where the PDCCH configuration information includes a searching space set.

The network-side device configures the searching space set for each BWP of the PCell, where the searching space set includes a candidate searching space used for the SCell(s) to perform cross-carrier scheduling on the PCell. Correspondingly, the UE receives the searching space set configured by the network-side device for each BWP of the PCell. Optionally, the searching space set further includes a searching space for self-carrier scheduling, and an index of the searching space for self-carrier scheduling has no intersection with an index of the candidate searching space.

Optionally, the candidate searching space is at least one candidate searching space used for the SCell to perform cross-carrier scheduling on the PCell. Optionally, the candidate searching space further supports self-carrier scheduling.

In some implementations, the searching space set configured for each BWP of the PCell includes a first searching space and a second searching space. The first searching space includes at least one searching space for self-carrier scheduling, and the second searching space includes at least one candidate searching space used for cross-carrier scheduling by the SCell on the PCell. An index of the first searching space has no intersection with an index of the second searching space.

Optionally, the first searching space is only used for self-carrier scheduling, that is, the first searching space is unable to support cross-carrier scheduling. The second searching space is only used for the SCell to perform cross-carrier scheduling on the PCell, that is, the second searching space is unable to support self-carrier scheduling.

In some implementations, the searching space set configured for each BWP of the PCell includes a third searching space and a fourth searching space. The third searching space includes at least one searching space for self-carrier scheduling, and the fourth searching space includes at least one searching space used for the SCell to perform cross-carrier scheduling on the PCell or used for self-carrier scheduling. An index of the third searching space has no intersection with an index of the fourth searching space.

Optionally, the third searching space is only used for self-carrier scheduling, that is, the third searching space is unable to support cross-carrier scheduling. The fourth searching space is used for the SCell to perform cross-carrier scheduling on the PCell or used for self-carrier scheduling, that is, the fourth searching space supports not only cross-carrier scheduling but also self-carrier scheduling. A setting manner for the searching space set will not be limited in the implementation.

Subsequent to configuring the searching space set for each BWP of the PCell, the network-side device assigns the candidate searching space as the searching space to-be-monitored, adds the candidate searching space into a searching space list, and determines the higher-layer parameter configuration according to the searching space list.

The network-side device adds the candidate searching space into the newly-introduced searching space list, where the searching space list is used to store at least one searching space to-be-monitored in the SCell.

The network-side device determines the higher-layer parameter configuration according to the searching space list, where the higher-layer parameter configuration indicates the searching space to-be-monitored in the SCell.

At 302, the network-side device transmits the higher-layer signaling carrying the scheduling configuration information.

Optionally, the higher-layer signaling further carries self-scheduling information of the PCell. Optionally, the higher-layer signaling further carries the cross-carrier scheduling information and/or the higher-layer parameter configuration.

Exemplarily, the higher-layer signaling further carries cross-carrier scheduling information corresponding to a SCell in a case that the PCell is scheduled by the SCell. The higher-layer signaling further carries cross-carrier scheduling information corresponding to each of multiple SCells in a case that the PCell is scheduled by the multiple SCells.

Optionally, the higher-layer parameter configuration indicates the searching space to-be-monitored in the SCell.

It is to be noted that, for the procedure that the network-side device transmits the higher-layer signaling carrying the scheduling configuration information, reference can be made to related details of the procedure that the network-side device transmits the higher-layer signaling in the foregoing implementations, which will not be repeated herein.

At 303, the UE receives the higher-layer signaling carrying the scheduling configuration information.

Correspondingly, the UE receives the higher-layer signaling carrying the scheduling configuration information transmitted by the network-side device, where the scheduling configuration information indicates that the PCell supports cross-carrier scheduling by the one or more SCells.

It is to be noted that, for the procedure that the UE receives the higher-layer signaling carrying the scheduling configuration information, reference can be made to related details of the procedure that the UE receives the higher-layer signaling in the foregoing implementations, which will not be repeated herein.

Optionally, the higher-layer signaling further carries the cross-carrier scheduling information and/or the higher-layer parameter configuration.

Optionally, the higher-layer parameter configuration indicates the searching space to-be-monitored in the SCell. After the UE receives the higher-layer signaling carrying the higher-layer parameter configuration, the higher-layer parameter configuration instructs the UE to determine the searching space to-be-monitored indicated by the higher-layer parameter configuration, determine a target searching space of the SCell(s) in the searching space to-be-monitored, monitor the PDCCH of the SCell in the target searching space of the SCell(s), and monitor the PDCCH of the PCell.

At 304, the UE performs cross-carrier scheduling on the PCell through the one or more SCells according to the higher-layer signaling.

The UE monitors the PDCCH of the PCell on the one or more SCells according to the higher-layer signaling.

Optionally, subsequent to receiving the higher-layer signaling carrying the higher-layer parameter configuration, the UE determines the searching space to-be-monitored indicated by the higher-layer parameter configuration, determines the target searching space of the SCell in the searching space to-be-monitored, where the target searching space is a searching space within a current active BWP of the SCell, monitors the PDCCH of the SCell in the target searching space of the SCell, and monitors the PDCCH of the PCell.

Optionally, the network-side device configures the searching space set for each BWP of the SCell, where the searching space set includes a searching space used to monitor the PDCCH of the SCell. Correspondingly, the UE receives the searching space set configured by the network-side device for each BWP of the SCell.

Optionally, subsequent to determining the searching space to-be-monitored indicated by the higher-layer parameter configuration, the UE determines the target searching space of the SCell in the searching space to-be-monitored according to the searching space set configured for the current active BWP of the SCell.

Optionally, the searching space to-be-monitored indicated by the higher-layer parameter configuration includes at least two searching spaces to-be-monitored. For each of the at least two searching spaces to-be-monitored, the UE determines whether the searching space to-be-monitored is in the searching space set configured for the current active BWP of the SCell. If the searching space to-be-monitored is in the searching space set configured for the current active BWP of the SCell, the UE determines the searching space to-be-monitored as the target searching space of the SCell.

Optionally, the target searching space of the SCell is a subset of the searching space to-be-monitored indicated by the higher-layer parameter configuration and includes one or more searching spaces.

It is to be noted that, in implementations of the disclosure, the searching space of the SCell is still only the searching space of the SCell, and no searching space will be additionally configured for the PCell, i.e., an existing searching space of the SCell is shared with the PCell.

Figure 4:
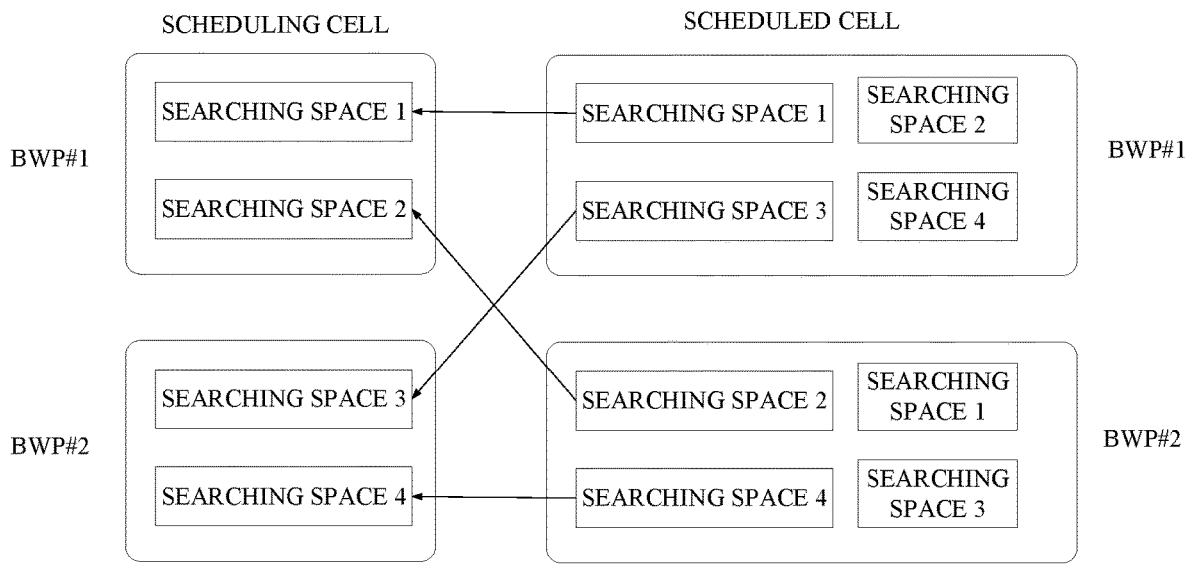
FIG. 4 is a schematic diagram of principles related to a method for cross-carrier scheduling provided in an exemplary implementation of the disclosure.

In an exemplary example, as illustrated in FIG. 4, a scheduled cell is a PCell, a current active BWP of the scheduled cell is BWP #1, and four searching spaces are configured for the current active BWP #1 of the PCell, where the four searching spaces include searching space 1 "SS set #1", searching space 2 "SS set #2", searching space 3 "SS set #3", and searching space 4 "SS set #4". A scheduling cell is a SCell, a current active BWP of the scheduling cell is BWP #1, and two searching spaces are configured for the current active BWP #1 of the SCell, where the two searching spaces include searching space 1 "SS set #1" and searching space 2 "SS set #2". Searching space 2 "SS set #2" and searching space 4 "SS set #4" are only used for self-carrier scheduling, while searching space 1 "SS set #1" and searching space 3 "SS set #3" are in a newly-introduced searching space list, which indicates that searching space 1 "SS set #1" and searching space 3 "SS set #3" each are the candidate searching space used for the SCell to perform cross-carrier scheduling on the PCell. A UE receives higher-layer signaling indicating that the PCell supports to be cross-carrier scheduled, where the higher-layer signaling further carries higher-layer parameter configuration indicating searching space 1 "SS set #1" to-be-monitored and searching space 3 "SS set #3" to-be-monitored in the SCell. Since searching space 1 "SS set #1" is within the current active BWP #1 of the SCell, the UE monitors a PDCCH of the SCell in searching space 1 "SS set #1" of the SCell and monitors a PDCCH of the scheduled cell, that is, the PCell.

In a word, a method for searching space configuration for cross-carrier scheduling from the SCell to the PCell is further provided in implementations of the disclosure. The network-side device configures the searching space set for each BWP of the PCell, where the searching space set includes the candidate searching space used for the SCell to perform cross-carrier scheduling on the PCell, assigns the candidate searching space as the searching space to-be-monitored, adds the candidate searching space into the searching space list, and determines the higher-layer parameter configuration according to the searching space list. As such, the network-side device can indicate, through the higher-layer parameter configuration, the searching space to-be-monitored in the SCell for the UE, which realizes condition configuration for cross-carrier-scheduling the PCell.

The following are apparatus implementations in implementations of the disclosure, and for parts not described in detail in the apparatus implementations, reference can be made to the disclosed technical details in the above method implementations.

Figure 5:
FIG. 5 is a schematic structural diagram of an apparatus for cross-carrier scheduling provided in an exemplary implementation of the disclosure.

Referring to FIG. 5, FIG. 5 is a schematic structural diagram of an apparatus for cross-carrier scheduling provided in an exemplary implementation of the disclosure. The apparatus for cross-carrier scheduling can be implemented as all or part of a network-side device through software, hardware, or a combination thereof. The apparatus for cross-carrier scheduling includes a transmitting module 510.

The transmitting module 510 is configured to transmit higher-layer signaling indicating that a PCell supports cross-carrier scheduling by one or more SCells.

In some implementations, the transmitting module 510 is further configured to configure scheduling configuration information indicating that the PCell supports cross-carrier scheduling by the one or more SCells, and transmit the higher-layer signaling carrying the scheduling configuration information.

In some implementations, the higher-layer signaling further carries cross-carrier scheduling information, and the cross-carrier scheduling information includes cross-carrier scheduling information corresponding to the SCell or the cross-carrier scheduling information includes cross-carrier scheduling information corresponding to each of the multiple SCells.

In some implementations, the cross-carrier scheduling information corresponding to the SCell contains a CIF value and a cell ID of the SCell.

In some implementations, the higher-layer signaling further carries higher-layer parameter configuration indicating a searching space to-be-monitored in the SCell.

In some implementations, the apparatus further includes a processing module. The processing module is configured to: configure a searching space set for each BWP of the PCell, where the searching space set includes a candidate searching space used for the SCell to perform cross-carrier scheduling on the PCell; assign the candidate searching space as the searching space to-be-monitored and add the candidate searching space into a searching space list; and determine the higher-layer parameter configuration according to the searching space list.

In some implementations, the searching space set further includes a searching space for self-carrier scheduling, and an index of the searching space for self-carrier scheduling has no intersection with an index of the candidate searching space.

In some implementations, the candidate searching space further supports self-carrier scheduling.

It is to be noted that, when the apparatus provided in the above implementations realizes its functions, division of the above functional modules is merely used as an example for illustration. In practical applications, the above functions can be allocated to different functional modules according to actual needs. That is, the content structure of the device can be divided into different functional modules to complete all or part of the above-mentioned functions.

For the apparatus in the above implementations, the specific manner of operation of each module has been described in detail in the implementations of the method, which will not be described in detail herein.

Figure 6:
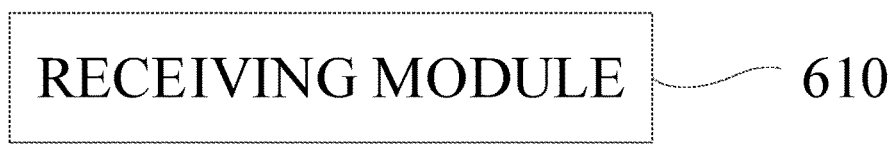
FIG. 6 is a schematic structural diagram of an apparatus for cross-carrier scheduling provided in another exemplary implementation of the disclosure.

Referring to FIG. 6, FIG. 6 is a schematic structural diagram of an apparatus for cross-carrier scheduling provided in another exemplary implementation of the disclosure. The apparatus for cross-carrier scheduling can be implemented as all or part of a network-side device through software, hardware, or a combination thereof. The apparatus for cross-carrier scheduling includes a receiving module 610.

The receiving module 610 is configured to receive higher-layer signaling indicating that a PCell supports cross-carrier scheduling by one or more SCells.

In some implementations, the receiving module 610 is further configured to receive the higher-layer signaling carrying scheduling configuration information indicating that the PCell supports cross-carrier scheduling by the one or more SCells.

In some implementations, the higher-layer signaling further carries cross-carrier scheduling information, and the cross-carrier scheduling information includes cross-carrier scheduling information corresponding to the SCell or the cross-carrier scheduling information includes cross-carrier scheduling information corresponding to each of the multiple SCells.

In some implementations, the cross-carrier scheduling information corresponding to the SCell contains a CIF value and a cell ID of the SCell.

In some implementations, the higher-layer signaling further carries higher-layer parameter configuration indicating a searching space to-be-monitored in the SCell.

In some implementations, the apparatus further includes a processing module. The processing module is configured to: determine the searching space to-be-monitored indicated by the higher-layer parameter configuration; determine a target searching space of the SCell in the searching space to-be-monitored, where the target searching space is a searching space within a current active BWP of the SCell; and monitor a PDCCH of the SCell in the target searching space of the SCell, and monitor a PDCCH of the PCell.

It is to be noted that, when the apparatus provided in the above implementations realizes its functions, division of the above functional modules is merely used as an example for illustration. In practical applications, the above functions can be allocated to different functional modules according to actual needs. That is, the content structure of the device can be divided into different functional modules to complete all or part of the above-mentioned functions.

For the apparatus in the above implementations, the specific mode of operation of each module has been described in detail in the implementations of the method, which will not be described in detail herein.

Figure 7:
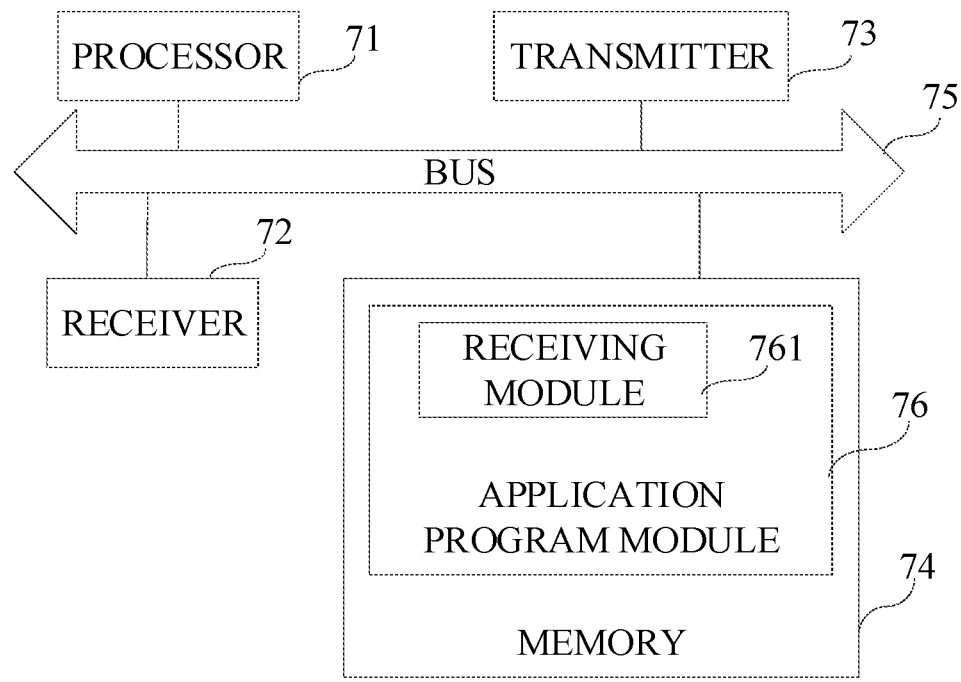
FIG. 7 is a schematic structural diagram of a user equipment (UE) provided in an exemplary implementation of the disclosure.

Referring to FIG. 7, FIG. 7 is a schematic structural diagram of a UE provided in an exemplary implementation of the disclosure. The UE may be the UE 140 in the mobile communication system illustrated in FIG. 1. In the implementation, the UE being a UE in an LTE system or a 5G system is taken as an example for illustration. The UE includes a processor 71, a receiver 72, a transmitter 73, a memory 74, and a bus 75. The memory 74 is coupled with the processor 71 via the bus 75.

The processor 71 includes one or more processing cores. The processor 71 is configured to perform various functional applications and information processing through executing software programs and modules.

The receiver 72 and the transmitter 73 can be implemented as a communication component, where the communication component may be a communication chip. The communication chip may include a receiving module, a transmitting module, a modulation and demodulation module, or the like. The communication chip is configured to modulate and/or demodulate information, and receive or transmit the information through a wireless signal.

The memory 74 can be configured to store instructions executable by the processor 71.

The memory 74 can be configured to store at least one application program module 76 with the above function. The application program module 76 may include a receiving module 761.

The processor 71 is configured to perform the receiving module 761 to realize functions related to receiving operations performed by the UE in the foregoing method implementations.

In addition, the memory 74 can be implemented by any type of transitory or non-transitory storage device or a combination thereof, e.g., a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disc, or an optical disc.

Figure 8:
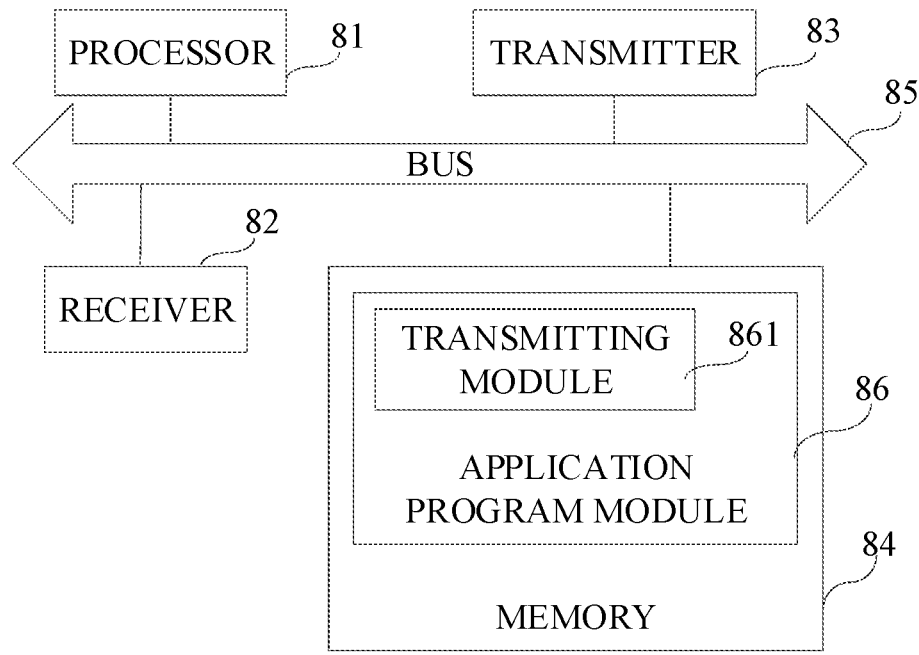
FIG. 8 is a schematic structural diagram of a network-side device provided in an exemplary implementation of the disclosure.

Referring to FIG. 8, FIG. 8 is a schematic structural diagram of a network-side device provided in an exemplary implementation of the disclosure. In the implementation, the network-side device being an eNB in an LTE system or a gNB in a 5G system is taken as an example for illustration. The network-side device includes a processor 81, a receiver 82, a transmitter 83, a memory 84, and a bus 85. The memory 84 is coupled with the processor 81 via the bus 85.

The processor 81 includes one or more processing cores. The processor 81 is configured to perform various functional applications and information processing through executing software programs and modules.

The receiver 82 and the transmitter 83 can be implemented as a communication component, where the communication component may be a communication chip. The communication chip may include a receiving module, a transmitting module, a modulation and demodulation module, or the like. The communication chip is configured to modulate and/or demodulate information, and receive or transmit the information through a wireless signal.

The memory 84 can be configured to store instructions executable by the processor 81.

The memory 84 can be configured to store at least one application program module 86 with the above function. The application program module 86 may include a transmitting module 861.

The processor 81 is configured to execute the transmitting module 861 to realize functions related to transmitting operations performed by the network-side device in the foregoing method implementations.

In addition, the memory 84 can be implemented by any type of transitory or non-transitory storage device or a combination thereof, e.g., a SRAM, an EEPROM, an EPROM, a PROM, an ROM, a magnetic memory, a flash memory, a magnetic disc, or an optical disc.

A network-side device is further provided in implementations of the disclosure. The network-side device includes a processor and a memory configured to store instructions executable by the processor, where the processor is configured to implement the operations performed by the network-side device in the foregoing method implementations.

A UE is further provided in implementations of the disclosure. The UE includes a processor and a memory configured to store instructions executable by the processor, where the processor is configured to implement the operations performed by the UE in the foregoing method implementations.

A non-transitory computer readable storage medium is further provided in implementations of the disclosure. The non-transitory computer readable storage medium is configured to store computer program instructions which, when executed by a processor, are operable with the processor to implement any of the foregoing method implementations.

This disclosure can be a system, a method, and/or a computer program product. The computer program product includes a computer readable storage medium, which carries computer readable program instructions for a processor to implement various aspects of the disclosure.

The computer-readable storage medium may be a tangible device that can hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination of the above. More specific examples (non-exhaustive list) of a computer-readable storage medium include: portable computer disk, hard disk, random access memory (RAM), read only memory (ROM), erasable programmable ROM (EPROM or flash memory), static RAM (SRAM), portable compact disk ROM (CD-ROM), digital multifunction disk (DVD), a memory stick, a floppy disk, a mechanical encoding device, such as a punch card or a convex structure in a groove on which instructions are stored, and any suitable combination of the above. The computer-readable storage medium used herein is not interpreted as an instantaneous signal itself, such as a radio wave or other freely propagating electromagnetic wave, an electromagnetic wave propagating through a waveguide or other transmission medium (for example, an optical pulse through an optical fiber cable), or an electrical signal transmitted through a wire.

The computer-readable program instructions described herein may be downloaded from a computer-readable storage medium to various computing/processing devices, or to an external computer or external storage device through a network, such as the Internet, a local area network (LAN), a wide area network (WAN), and/or a wireless network. The network may include copper transmission cables, optical fiber transmission, wireless transmission, routers, firewalls, switches, gateway computers, and/or edge servers. The network adapter card or network interface in each computing/processing device receives computer-readable program instructions from the network and forwards the computer-readable program instructions to be stored in the computer-readable storage medium in each computing/processing device.

The computer program instructions for performing the operations of the disclosure may be assembly instructions, instruction set architecture (ISA) instructions, machine instructions, machine related instructions, microcode, firmware instructions, status setting data, or source code or object code written in any combination of one or more programming languages. The programming languages include object-oriented programming languages such as Smalltalk, C++, etc., and conventional procedural programming languages such as "C" language or similar programming languages. Computer readable program instructions may be executed completely on a user's computer, partially on the user's computer, as a separate software package, partially on the user's computer and partially on a remote computer, or completely on the remote computer or server. In the case of the remote computer, the remote computer may be connected to the user computer through any kind of network, including a LAN or a WAN, or may be connected to an external computer (for example, connected through an Internet via an Internet service provider). In some implementations, an electronic circuit such as a programmable logic circuit, a field programmable gate array (FPGA), or a programmable logic array (PLA) can be personalized by utilizing the state information of computer-readable program instructions. The electronic circuit can carry out computer readable program instructions, so as to implement various aspects of the disclosure.

Various aspects of the disclosure are described herein with reference to flowcharts and/or block diagrams of methods, devices (systems) and computer program products according to implementations of the disclosure. It should be understood that each block of a flowchart and/or block diagram and a combination of blocks in the flowchart and/or block diagram may be implemented by computer-readable program instructions.

These computer-readable program instructions can be provided to a processor of a general-purpose computer, a special-purpose computer, or other programmable data processing devices, so as to produce a machine so that when these instructions are executed by a processor of a computer or other programmable data processing devices, a device is generated to realize the functions/actions specified in one or more blocks in the flowchart and/or block diagram. These computer-readable program instructions may also be stored in a computer-readable storage medium, to cause computers, programmable data processing devices, and/or other devices to operate in a specific manner, so that the computer-readable medium in which the instructions are stored includes a manufacture which includes instructions to implement various aspects of the functions/actions specified in one or more blocks in the flowchart and/or block diagram.

Computer readable program instructions may also be loaded onto a computer, other programmable data processing devices, or other devices, so that a series of operation steps are performed on the computer, other programmable data processing device, or other devices to generate a computer implemented process, so that instructions executed in the computer, other programmable data processing device, or other devices can realize the functions/actions specified in one or more blocks in the flowchart and/or block diagram.

The flowchart and block diagram in the accompanying drawings show the architecture, functions and operations of possible implementations of systems, methods and computer program products according to various implementations of the disclosure. In this regard, each block in the flowchart or block diagram may represent a part of a module, program segment, or instruction containing one or more executable instructions for realizing a specified logical function. In some alternative implementations, the functions marked in the blocks may also occur in a different order than those marked in the drawings. For example, two consecutive blocks can actually be executed basically in parallel, and they sometimes can be executed in the opposite order, depending on the function involved. It should also be noted that each block in the block diagram and/or flowchart and the combination of blocks in the block diagram and/or flowchart can be realized by a dedicated hardware based system performing specified functions or actions, or by a combination of dedicated hardware and computer instructions.

Various implementations of the present disclosure have been described above, and the above description is exemplary rather than exhaustive, and is not limited to the various implementations disclosed. Without departing from the scope and spirit of the various implementations described, many modifications and changes are obvious to those skilled in the art. The terms used herein are selected to best explain the principle, practical application, or improvement of the technology in the market of each implementation, or to enable other ordinary skilled person in the art to understand the various implementations disclosed herein.

What is claimed is:

1. A method for cross-carrier scheduling, applied to a network-side device and comprising:
    transmitting higher-layer signaling, wherein the higher-layer signaling carries scheduling configuration information indicating that a primary cell (PCell) can be cross-carrier scheduled by one or more secondary cells (SCells) and higher-layer parameter configuration indicating one or more searching spaces to-be-monitored in the one or more SCells,
    wherein the method further comprises:
    configuring a searching space set for a bandwidth part (BWP) of the PCell, wherein the searching space set comprises one or more candidate searching spaces used by the one or more SCells to perform cross-carrier scheduling on the PCell;

assigning the one or more candidate searching spaces as the one or more searching spaces to-be-monitored and adding the one or more candidate searching spaces into a searching space list; and determining the higher-layer parameter configuration according to the searching space list.

2. The method of claim 1, wherein the higher-layer signaling further carries cross-carrier scheduling information; and the cross-carrier scheduling information comprises cross-carrier scheduling information corresponding to a SCell on condition that the PCell is scheduled by the SCell; or the cross-carrier scheduling information comprises cross-carrier scheduling information corresponding to each of multiple SCells on condition that the PCell is scheduled by the multiple SCells.

3. The method of claim 2, wherein the cross-carrier scheduling information corresponding to the SCell or the cross-carrier scheduling information corresponding to each of the multiple SCells contains a carrier indicator field (CIF) value and a cell identifier (ID) of the corresponding SCell.

4. The method of claim 1, wherein the searching space set further comprises a searching space for self-scheduling, and an index of the searching space for self-scheduling has no intersection with an index of the candidate searching space.

5. The method of claim 4, wherein the one or more candidate searching spaces further can be self-scheduled.

6. A method for cross-carrier scheduling, applied to a user equipment (UE) and comprising:

receiving higher-layer signaling, wherein the higher-layer signaling carries scheduling configuration information indicating that a primary cell (PCell) can be cross-carrier scheduled by one or more secondary cells (SCells) and higher-layer parameter configuration indicating one or more searching spaces to-be-monitored in the one or more SCells, wherein the method further comprises:

determining the one or more searching spaces to-be-monitored indicated by the higher-layer parameter configuration;

determining a target searching space of the one or more SCells in the one or more searching spaces to-be-monitored, wherein the target searching space is a searching space within a current active bandwidth part (BWP) of the one or more SCells; and monitoring a physical downlink control channel (PDCCH) of the one or more SCells in the target searching space of the one or more SCells, and monitoring a PDCCH of the PCell.

7. The method of claim 6, wherein the higher-layer signaling further carries cross-carrier scheduling information; and the cross-carrier scheduling information comprises cross-carrier scheduling information corresponding to a SCell on condition that the PCell is scheduled by the SCell; or the cross-carrier scheduling information comprises cross-carrier scheduling information corresponding to each of multiple SCells on condition that the PCell is scheduled by the multiple SCells.

8. The method of claim 7, wherein the cross-carrier scheduling information corresponding to the SCell or the cross-carrier scheduling information corresponding to each of the multiple SCells contains a carrier indicator field (CIF) value and a cell identifier (ID) of the SCell.

9. A network-side device, comprising:

a transceiver;

a processor; and a memory configured to store instructions executable by the processor, wherein the processor is configured to execute the instructions to cause the transceiver to transmit higher-layer signaling, wherein the higher-layer signaling carries scheduling configuration information indicating that a primary cell (PCell) can be cross-carrier scheduled by one or more secondary cells (SCells) and higher-layer parameter configuration indicating one or more searching spaces to-be-monitored in the one or more SCells;

wherein the processor is configured to:

configure a searching space set for a bandwidth part (BWP) of the PCell, wherein the searching space set comprises one or more candidate searching spaces used by the one or more SCells to perform cross-carrier scheduling on the PCell;

assign the one or more candidate searching spaces as the one or more searching spaces to-be-monitored and adding the one or more candidate searching spaces into a searching space list; and determine the higher-layer parameter configuration according to the searching space list.

10. The network-side device of claim 9, wherein the higher-layer signaling further carries cross-carrier scheduling information; and the cross-carrier scheduling information comprises cross-carrier scheduling information corresponding to a SCell on condition that the PCell is scheduled by the SCell; or the cross-carrier scheduling information comprises cross-carrier scheduling information corresponding to each of multiple SCells on condition that the PCell is scheduled by the multiple SCells.

11. The network-side device of claim 10, wherein the cross-carrier scheduling information corresponding to the SCell or the cross-carrier scheduling information corresponding to each of the multiple SCells contains a carrier indicator field (CIF) value and a cell identifier (ID) of the corresponding SCell.

* * * * *